(12) United States Patent
Asaoka

(10) Patent No.: US 7,976,429 B2
(45) Date of Patent: Jul. 12, 2011

(54) CONTINUOUSLY VARIABLE TRANSMISSION

(75) Inventor: Ryousuke Asaoka, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 768 days.

(21) Appl. No.: 12/098,307

(22) Filed: Apr. 4, 2008

(65) Prior Publication Data

US 2008/0248919 A1 Oct. 9, 2008

(30) Foreign Application Priority Data

Apr. 5, 2007 (JP) ................................. 2007-099818

(51) Int. Cl.
*B60W 10/00* (2006.01)
(52) U.S. Cl. ........................................................ 477/39

(58) Field of Classification Search ..................... 474/11, 474/12
See application file for complete search history.

(56) References Cited

U.S. PATENT DOCUMENTS

| 6,682,450 B2 * | 1/2004 | Mukai et al. .................... 474/15 |
| 7,862,459 B2 * | 1/2011 | Ishioka ........................... 474/70 |

FOREIGN PATENT DOCUMENTS

| JP | 06-249329 | 9/1994 |
| JP | 2006-071096 | 3/2006 |

* cited by examiner

*Primary Examiner* — Dirk Wright
(74) *Attorney, Agent, or Firm* — Rabin & Berdo, PC

(57) ABSTRACT

A continuously variable transmission for a motorcycle that provides appropriate engagement of a centrifugal clutch when a clutch shoe is worn. A control unit controls a change gear ratio to a TOP side to engage the centrifugal clutch when the centrifugal clutch is disengaged and an engine rotational speed is higher than a predetermined first rotational speed.

18 Claims, 15 Drawing Sheets

CONTINUOUSLY VARIABLE TRANSMISSION

RELATED APPLICATIONS

This application claims the benefit of priority under 35 USC 119 of Japanese patent application no. 2007-099818, filed on Apr. 5, 2007, which application is hereby incorporated by reference in its entirety.

BACKGROUND OF THE INVENTION

1. Field of the Invention

The present invention relates to a continuously variable transmission for transmitting power from an output shaft of a drive unit to an input shaft of a centrifugal clutch in which a change gear ratio is controlled by a control unit.

2. Description of Related Art

As shown in FIGS. 1 and 2, for example, power in a power unit 900 of a scooter-type motorcycle 1000 is transmitted in the following order: an engine 100 as a drive unit; a continuously variable transmission 200; a centrifugal clutch 300; a reduction gear 400; and a driving wheel 500. As shown in FIG. 3, centrifugal clutch 300 is mounted between a hollow central axis 12 (secondary or input shaft of centrifugal clutch 300) of a secondary sheave 14 of continuously variable transmission 200 and a final gear shaft 401 (output shaft of centrifugal clutch 300) extended through central axis 12. As shown in FIGS. 3 and 4, centrifugal clutch 300 includes a clutch plate 301, a clutch shoe 302, a clutch spring 303 and a clutch housing 304 (clutch outer).

As shown in FIG. 3, clutch plate 301 is fixed to central axis 12 of secondary sheave 14 of continuously variable transmission 200. Pin 305 for assembling clutch shoe 302 is provided in a protruding manner in clutch plate 301. In the example of FIG. 3, three pins 305 are attached at regular intervals in a circumferential direction. As shown in FIG. 4, one end of clutch shoe 302 is attached to pin 305 for turning, which is attached to clutch plate 301. Clutch spring 303 couples one end of clutch shoe 302 with the other end of an adjacent clutch shoe 302 in the circumferential direction. Clutch spring 303 exerts an elastic reaction force for constantly attracting one end and the other end of the adjacent clutch shoe 302. Clutch housing 304 is a bowl-shaped member attached to final gear shaft 401, which extends through the hollow central axis 12 of secondary sheave 14, and covers an assembly 310 of clutch shoe 302.

When engine 100 is at a stop, as shown in FIG. 4, assembly 310 of clutch shoe 302 is contracted as a whole by the elastic reaction force of clutch springs 303, and clutch shoes 302 and clutch housing 304 are not in contact with each other. When secondary sheave 14 starts rotating at startup of engine 100, as shown in FIG. 5, assembly 310 of clutch shoe 302 expands as a whole with its centrifugal force against the elastic reaction force of clutch spring 303, and clutch shoes 302 come in contact with clutch housing 304. Then, after a stalling state in which clutch shoe 302 and clutch housing 304 transmit torque while sliding, clutch shoes 302 and clutch housing 304 reach a connected state by frictional force acting between clutch shoes 302 and clutch housing 304. Torque in response to the frictional force of clutch shoes 302 and clutch housing 304 is transmitted to output shaft 401. JP-A-2006-71096, for example, discloses such a centrifugal clutch.

A change gear ratio of continuously variable transmission 200 is controlled by a control unit 600, as shown in FIG. 2. Control unit 600 is provided with a database (gear ratio map) for setting in advance target change gear ratios to be a control target based on vehicle speed, engine rotational speed, throttle opening, and the like in various driving modes while a vehicle is running. Control unit 600 follows the gear ratio map to set the target change gear ratio becoming a control target based on information such as actual vehicle speed and throttle opening.

A greater force is needed at startup. Therefore, continuously variable transmission 200 is usually controlled in a predetermined LOW ratio at startup. On the contrary, a startup ratio memorizing means for storing preset change gear ratios at startup according to various throttle openings is provided in JP-A-3194641. Once an engine speed passes a preset value in an upward direction, a startup ratio memorizing means retrieves the change gear ratio at startup that corresponds to the throttle opening, and the change gear ratio of the continuously variable transmission is then adjusted to be the readout change gear ratio.

The same patent document discloses that the target change gear ratio of the continuously variable transmission is set according to the throttle opening at startup, that is, that the target change gear ratio is controlled closer to a TOP side than a maximum LOW ratio according to the throttle opening at startup. Also, according to the same patent document, "because a startup ratio is set in the early stage when the engine speed starts increasing, and because a pulley 6b of a continuously variable transmission 3 is driven, as shown in a dotted line in FIG. 5(b), a smooth start can be performed without the excessive rotational speed of the engine, occurrence of undershooting due to excessive suppression control of the excessive rotational speed of the engine, or repeating undershooting and overshooting, that is, so-called hunting" by such control (JP-A-2006-71096, para. 0037).

In a case where a clutch shoe has been worn in a considerable degree due to aged deterioration and the like, the engine rotational speed becomes abnormally high at startup by the time the centrifugal clutch is engaged. As described above, in the case where clutch shoe 302 has been worn in a considerable degree due to aged deterioration and the like, a stalling state of a centrifugal clutch 300 continues for a long period of time, and a rotational speed of an engine 100 becomes abnormally high. Therefore, an abraded member of clutch shoe 302 comes in a state where they can be further easily worn. As a result, replacement of clutch shoe 302 is required at a faster pace. Because change gear ratios are uniformly controlled to a predetermined LOW ratio in response to a throttle opening in the control of JP-A-3194641, the aforementioned problem is not solved by the control of JP-A-3194641.

SUMMARY OF THE INVENTION

A continuously variable transmission according to the present invention transmits power from an output shaft of a drive unit to an input shaft of a centrifugal clutch. A change gear ratio is controlled by a control unit. The control unit performs clutch engagement processing for controlling the change gear ratio to a TOP side in order to engage the centrifugal clutch in a case where the centrifugal clutch is disengaged, and where rotational speed of the drive unit is higher than a predetermined first rotational speed.

According to the present invention, the change gear ratio is controlled to the TOP side by clutch engagement processing to engage the centrifugal clutch when the centrifugal clutch is disengaged and the speed of the drive unit is higher than a predetermined rotational speed. Therefore, the rotational speed of the drive unit is prevented from becoming abnormally higher than the predetermined rotational speed of the drive unit, and the centrifugal clutch can be engaged at an early stage by shortening a period of time in which the centrifugal clutch stalls. Further deterioration of the centrifugal clutch such as abrasion of a clutch shoe is thereby prevented. In addition, clutch engagement processing is not performed when the rotational speed of the drive unit does not become higher than the predetermined rotational speed. Therefore, when the centrifugal clutch functions normally, the continuously variable transmission is controlled normally, and an appropriate torque is obtained at startup.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
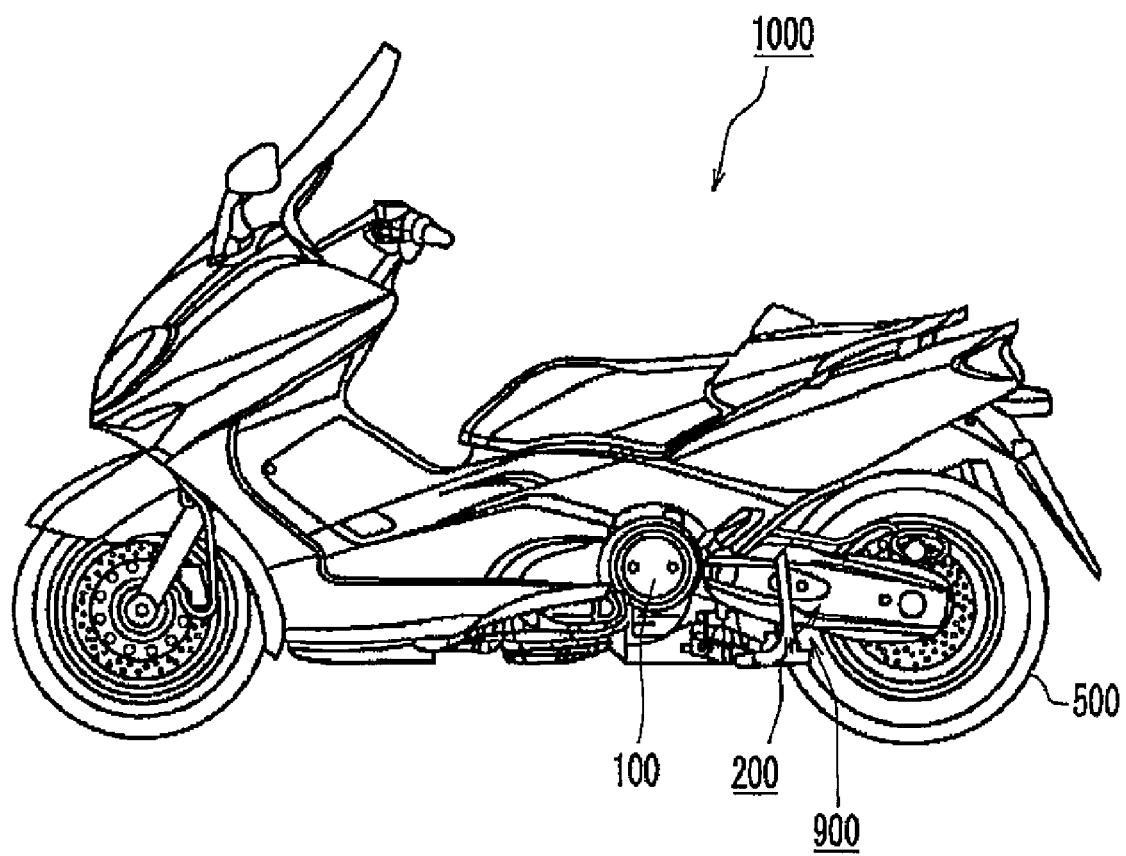
FIG. 1 is a side view of a motorcycle provided with a continuously variable transmission in accordance with an embodiment of the present invention.

A continuously variable transmission according to an embodiment of the present invention is now described with reference to the drawings. In the drawings, the same reference numerals are given to members and parts having the same functions. The present invention is not limited to the embodiments described below.

The inventor has considered an appropriate control method in relation to a continuously variable transmission for transmitting power from an output shaft of a drive unit to an input shaft of a centrifugal clutch. As described above, if clutch shoes have been worn to a considerable degree due to aged deterioration and the like, engine rotational speed becomes abnormally high at startup by the time the centrifugal clutch is engaged at startup. Ordinarily in such a case, the clutch shoe or the centrifugal clutch is replaced with a new one. In addition, engine rotational speed may become abnormally high at startup by the time the centrifugal clutch is engaged when, for example, foreign matter such as oil gets into a space between a clutch housing and the clutch shoe, or right after exchange to a brand-new clutch, or at startup in a cold condition, because friction between the clutch housing and clutch shoe is unstable. The inventor surmised that in such cases abnormal rise of engine rotational speed could be relieved by changing control of the continuously variable transmission.

Figure 2:
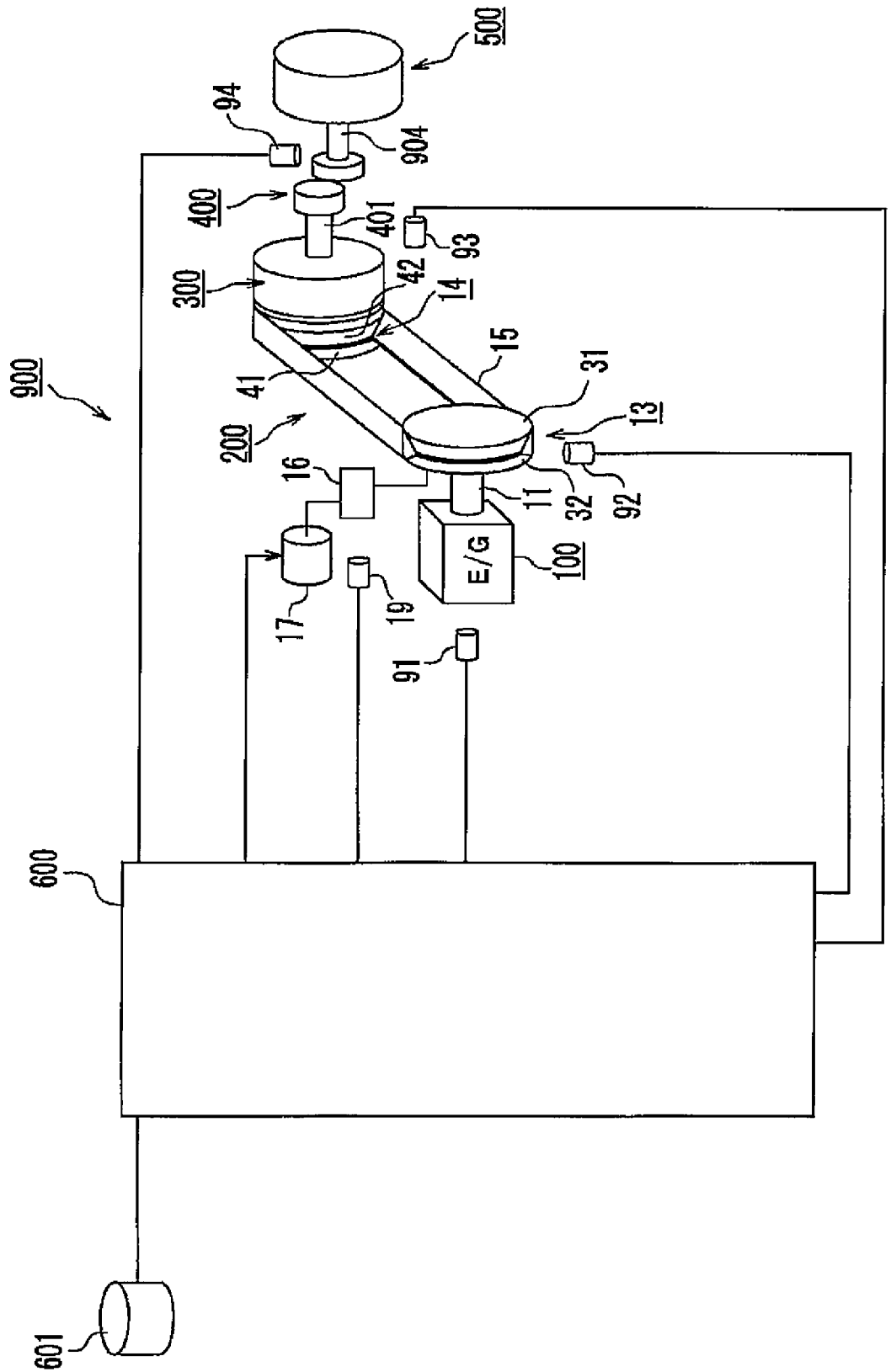
FIG. 2 is a schematic view of the continuously variable transmission.
Figure 6:
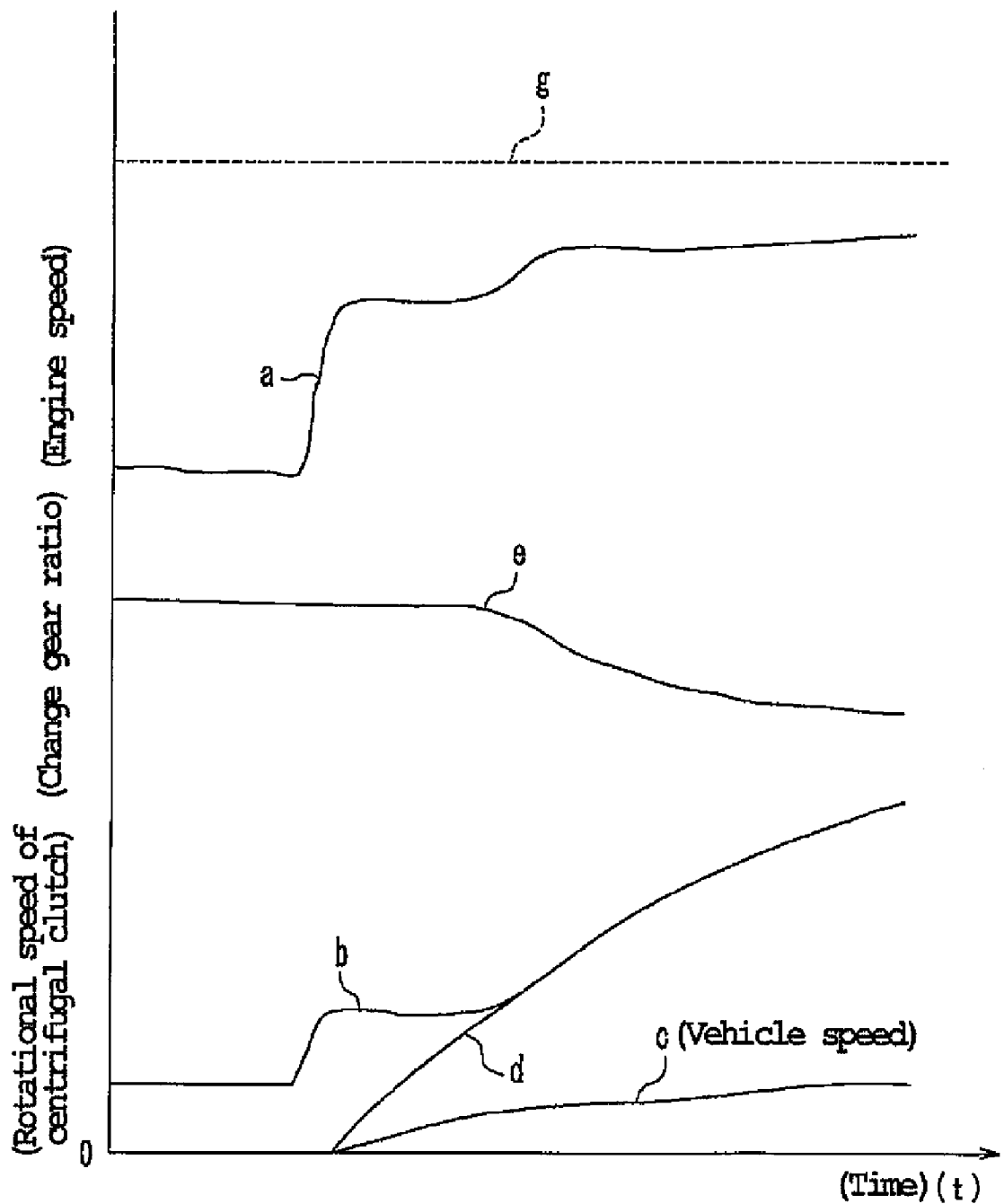
FIG. 6 is a diagram that indicates changes in rotational speed of an engine, a change gear ratio, rotational speed of the centrifugal clutch and vehicle speed at startup.

In order to study such an event, as shown in FIG. 6, the inventor measured a rotational speed "a" of an engine, a rotational speed "b" of a secondary sheave of the continuously variable transmission, and a vehicle speed "c" when motorcycle 1000 starts moving from rest. In addition, a rotational speed "d" of an output shaft 401 of a centrifugal clutch 300 is calculated from vehicle speed "c". A target change gear ratio "e" of the continuously variable transmission indicates target values of control, which are respectively set by a control unit. In this test, as shown in FIG. 2, target change gear ratio "e" as a control target is set based on information such as vehicle speed "c" and a throttle opening, following a preset gear ratio map 601.

Measurement results for a case where the centrifugal clutch functions normally are hereinafter indicated. As shown in FIG. 6, centrifugal clutch 300 begins stalling once engine rotational speed "a" increases to some extent. Where centrifugal clutch 300 functions normally, engine rotational speed "a" scarcely increases. Centrifugal clutch 300 is then engaged one or two seconds after centrifugal clutch 300 begins stalling. In addition, as shown in FIG. 6, when centrifugal clutch 300 is stalling, there occurs a difference between rotational speed "d" of output shaft 401 of centrifugal clutch 300 which are calculated from vehicle speed "c" and rotational speed "b" of the secondary sheave of a continuously variable transmission 200. Once centrifugal clutch 300 is engaged, rotational speed "d" of output shaft 401 coincides with rotational speed "b" of a secondary sheave 14 of continuously variable transmission 200.

Figure 7:
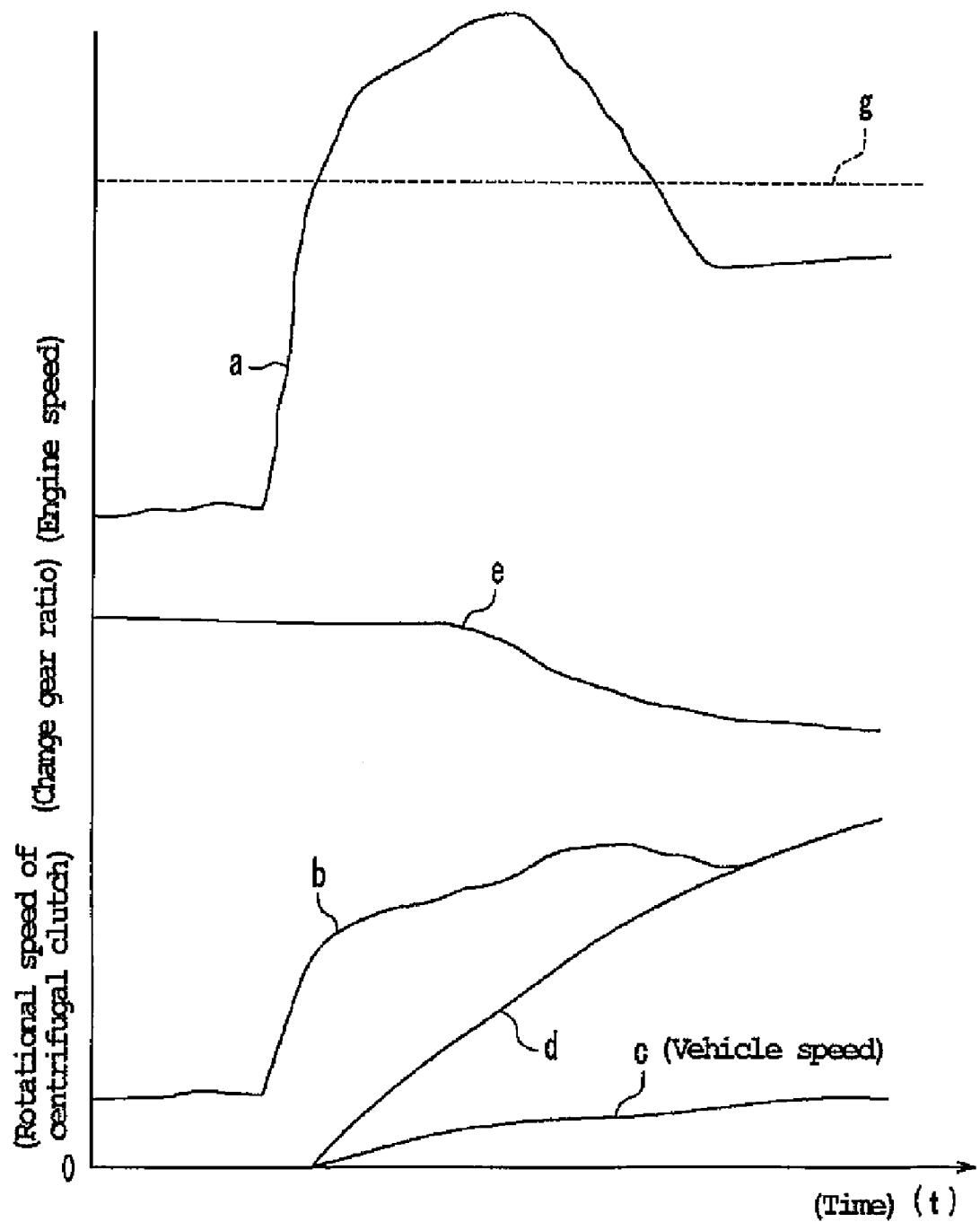
FIG. 7 is a diagram that indicates changes in the rotational speed of the engine, the change gear ratio, the rotational speed of the centrifugal clutch, and the vehicle speed at startup.

Next, measurement results for a case in which centrifugal clutch 300 functions abnormally due to abrasion of clutch shoes 302 to a considerable degree are indicated. In this case, as shown in FIG. 7, centrifugal clutch 300 begins stalling once engine rotational speed "a" increases to some extent. However, centrifugal clutch 300 is slow to be engaged afterwards because clutch shoes 302 are worn. In addition, because clutch shoes 302 are worn to a considerable degree, torque is slow to be transmitted to a driving wheel 500, and it consequently takes a long time for vehicle speed "c" to increase. Therefore, continuously variable transmission 200 is not shifted to the TOP side. Due to such circumstances, engine rotational speed "a" increases abnormally. In this example, it took approximately 3.5 seconds for centrifugal clutch 300 to be engaged after it began stalling.

Figure 5:
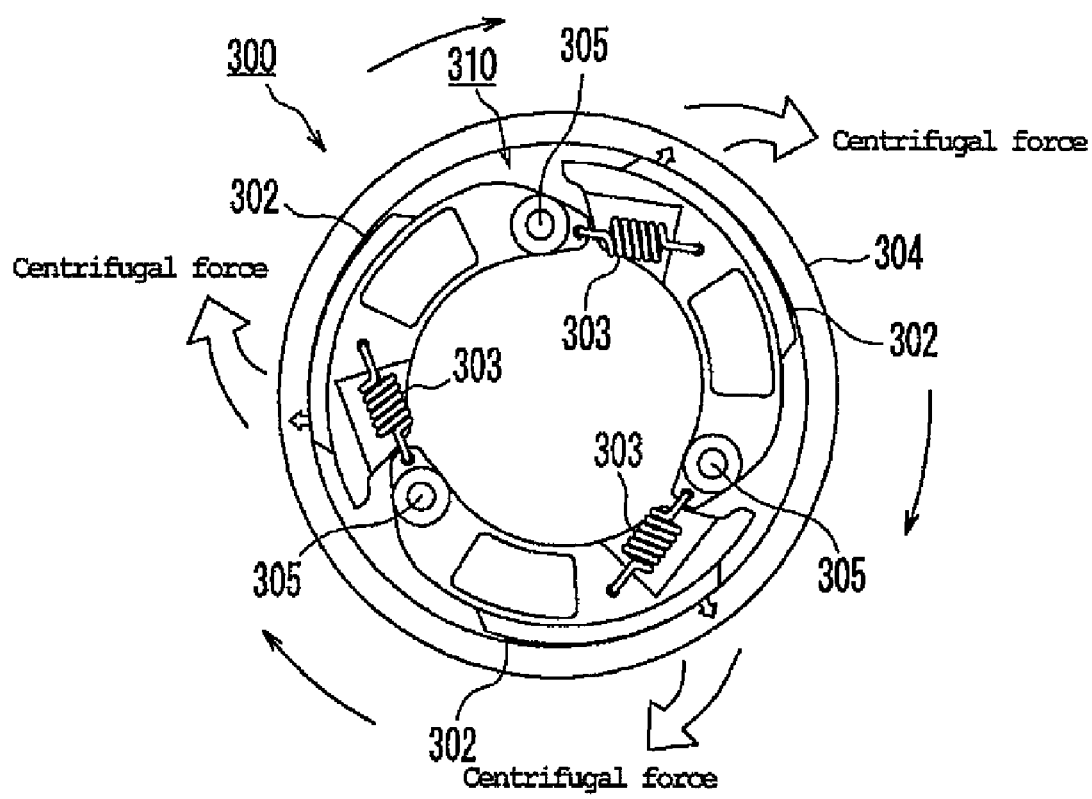
FIG. 5 is a cross-sectional front view showing a centrifugal clutch in use.

In the control in the aforementioned JP-A-3194641, for example, a target change gear ratio is set in accordance with a throttle opening at startup, as described in FIG. 5 of JP-A-3194641. Therefore, when centrifugal clutch 300 does not function normally due to abrasion of clutch shoes 302 to a considerable degree, centrifugal clutch 300 continues to stall for a long period of time, and the rotational speed of engine 100 may become abnormally high when centrifugal clutch 300 is engaged.

If the stalling state of centrifugal clutch 300 continues for a long period of time, clutch shoes 302 wear at a faster pace and must be replaced more often. In addition, if centrifugal clutch 300 continues to stall for a long period of time, the rotational speed of engine 100 also increases abnormally. The rotational speed of engine 100 is preferably kept low to some extent at startup. These circumstances are not limited to scooter-type motorcycles, and may occur in other types of vehicles.

The inventor further studied a relationship between a condition in which centrifugal clutch 300 is engaged and a change gear ratio of centrifugal clutch 200.

Figure 8:
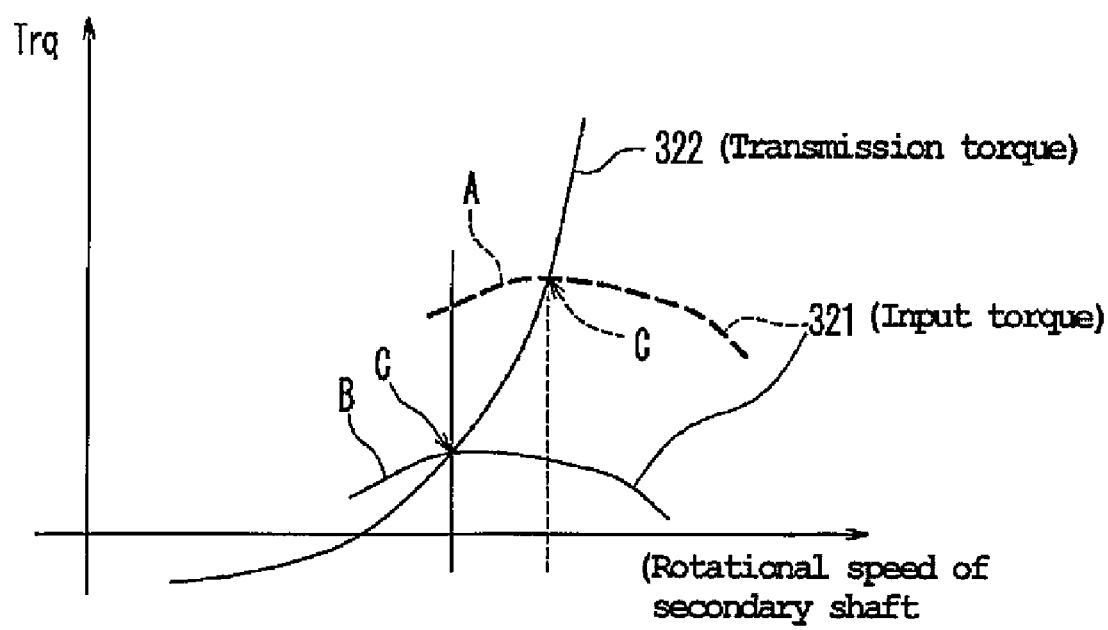
FIG. 8 is a diagram that indicates a relation between input torque and output torque of the centrifugal clutch.

As shown in FIG. 8, centrifugal clutch 300 is engaged when an input torque 321 input to centrifugal clutch 300 coincides with a transmission torque 322 that centrifugal clutch 300 can transmit (C). That is, as the rotational speed input to centrifugal clutch 300 becomes faster, the centrifugal force of centrifugal clutch 300 acting on clutch shoes 302 becomes greater. When transmission torque 322 of centrifugal clutch 300 becomes greater, and transmission torque 322 of centrifugal clutch 300 coincides with input torque 322 input to centrifugal clutch 300 (C), centrifugal clutch 300 is engaged.

When the change gear ratio of continuously variable transmission 200 is a LOW ratio, as shown by dotted line A in FIG. 8, input torque 321 input to centrifugal clutch 300 is high. Therefore, when the rotational speed of an input shaft (secondary shaft 12) of centrifugal clutch 300 becomes fast to a considerable degree, the centrifugal clutch is engaged.

When the change gear ratio comes closer to a TOP side than the aforementioned LOW ratio, the rotational speed input to centrifugal clutch 300 becomes faster, and the centrifugal force acting on clutch shoe 302 becomes greater. Therefore, transmission torque 322 becomes higher. On the contrary, as shown by solid line B in FIG. 8, input torque 321 input to centrifugal clutch 300 becomes lower because the change gear ratio is low. Therefore, centrifugal clutch 300 can be engaged at an early stage at startup (when the rotational speed of secondary shaft 12 is slower).

The inventor considered that centrifugal clutch 300 might be engaged in an appropriate manner while suppressing the abnormal rise of the rotational speed of engine 100 by controlling continuously variable transmission 200 to the TOP side at the right time even when clutch shoes 302 are worn to a considerable degree.

On the other hand, torque that the centrifugal clutch can transmit becomes low if continuously variable transmission 200 is controlled to the TOP side. Great force is required at startup, and the appropriate torque is also needed. Therefore, the inventor considered that it would not necessarily be desirable to uniformly control the change gear ratio of centrifugal clutch 300 to the TOP side in response to the throttle opening even when centrifugal clutch 300 functions normally, as disclosed in U.S. Pat. No. 3,194,641. In other words, appropriate starting torque is desirably obtained for motorcycle 1000 when centrifugal clutch 300 functions normally. Therefore, the inventor considered that it is desirable that the change gear ratio is not uniformly controlled in response to the throttle opening but is controlled in an appropriate amount, that is, to the TOP side at the right time in the case where centrifugal clutch 300 does not function normally and the rotational speed of engine 100 increases abnormally.

The inventor thus developed an innovative and entirely new control method for the continuously variable transmission based on these unique findings. A continuously variable transmission in accordance with an embodiment of the present invention is now described.

Figure 9:
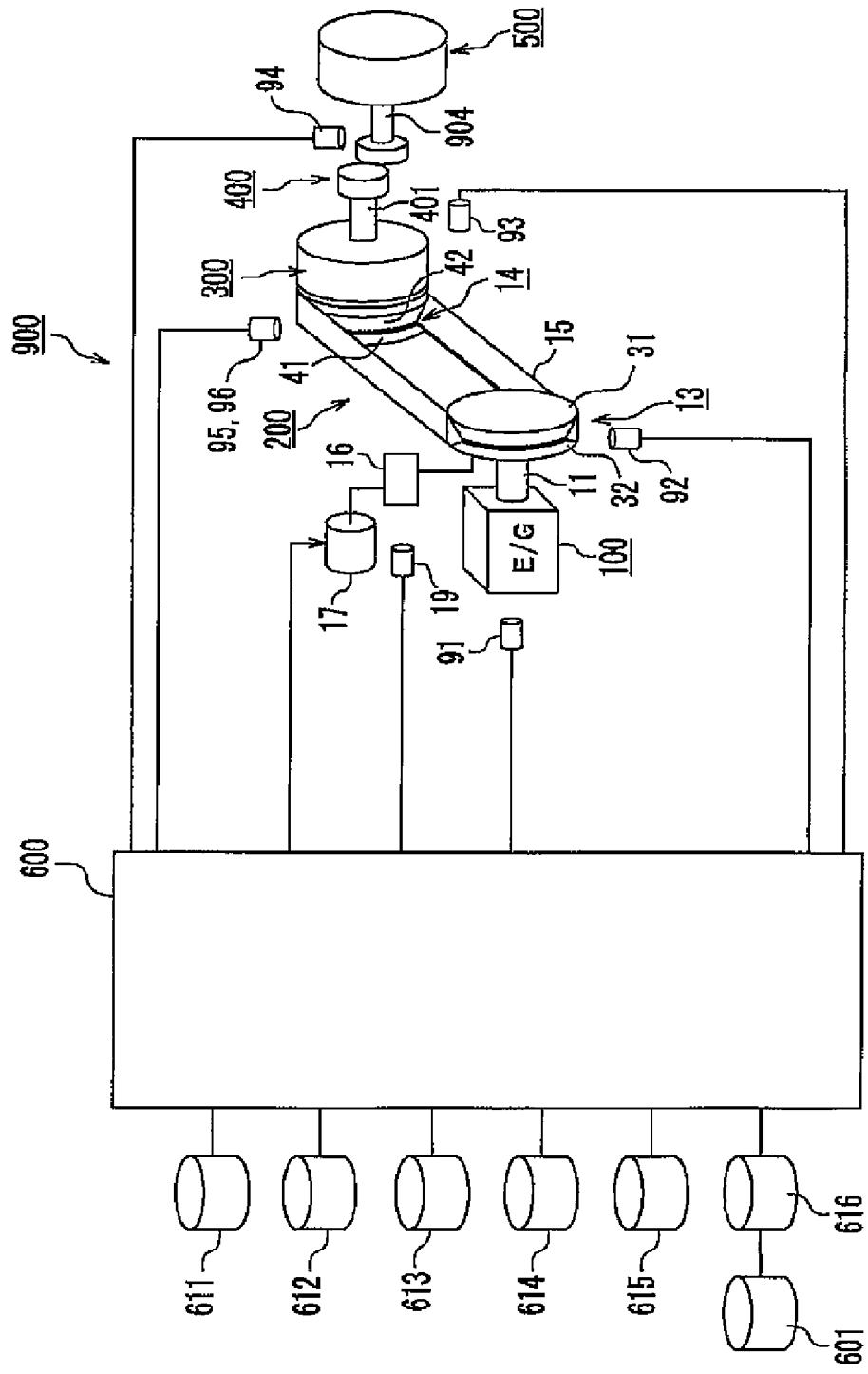
FIG. 9 is a schematic diagram of a continuously variable transmission in accordance with an embodiment of the present invention.

Continuously variable transmission 200, as shown in FIG. 9, transmits power from the output shaft of engine 100 (drive unit) to the input shaft of centrifugal clutch 300. The change gear ratio of continuously variable transmission 200 is controlled by a control unit 600. Continuously variable transmission 200 may be arranged in power unit 900 of motorcycle 1000, such as that of FIG. 1.

As shown in FIG. 9, continuously variable transmission 200 is a belt-type continuously variable transmission in which a belt 15 is wound around a primary sheave 13 and the secondary sheave 14 each having a pair of flanges relatively movable in an axial direction. Belt-type continuously variable transmission 200 includes a primary shaft 11, secondary shaft 12, primary sheave 13, secondary sheave 14, a belt 15, a groove width adjustment mechanism 16, an actuator 17, a flange position detection sensor 19 and control unit 600.

Figure 10:
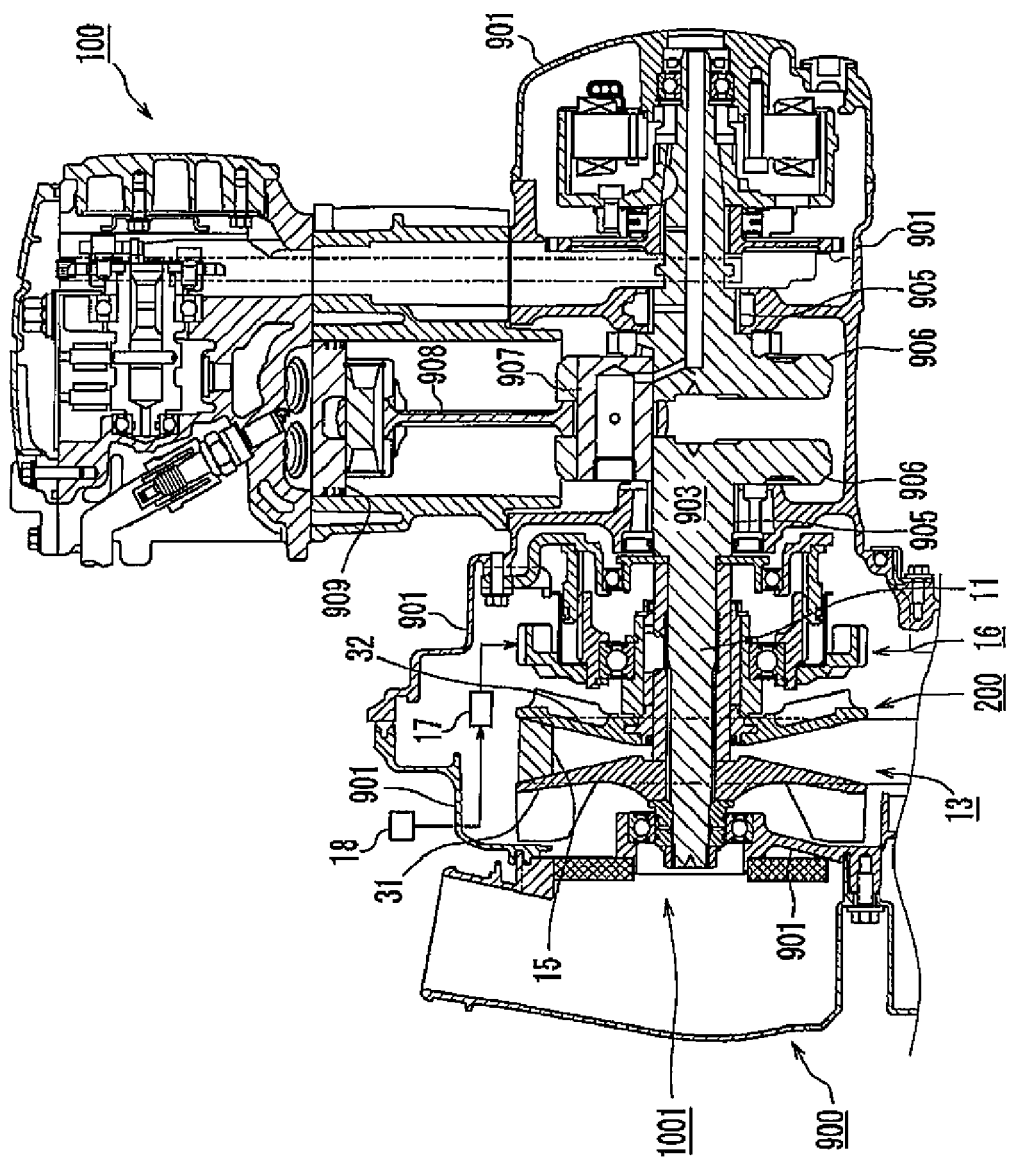
FIG. 10 is a partial sectional view of the continuously variable transmission in accordance with the embodiment of the present invention.
Figure 11:
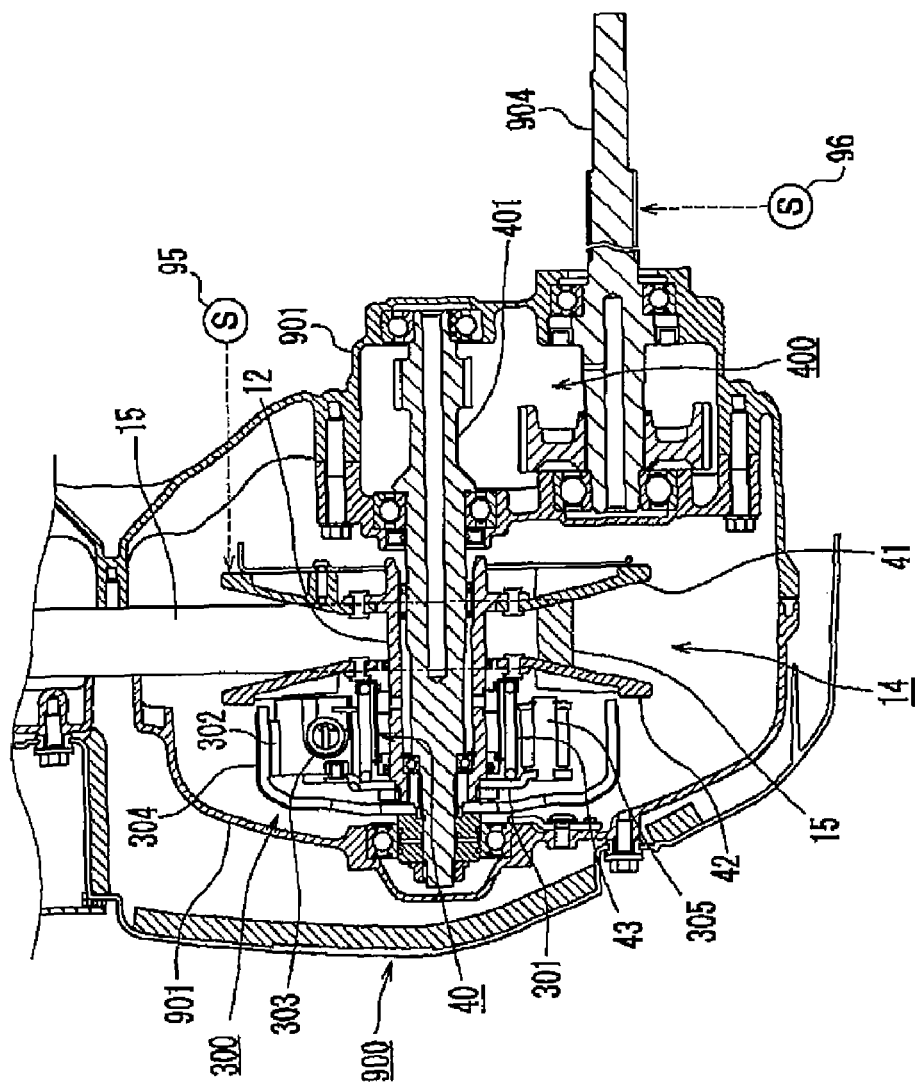
FIG. 11 is a partial sectional view of the continuously variable transmission in accordance with the embodiment of the present invention.

As shown in FIGS. 10 and 11, primary shaft 11 and secondary shaft 12 are attached to a case 901 of power unit 900 via bearings. Primary shaft 11 is integrally formed with a crankshaft 903, which is the output shaft of engine 100. Secondary shaft 12 is disposed in parallel with primary shaft 11 and is coupled with a drive shaft 904. Various members for constituting a crank journal 905, a crank web 906, a crank pin 907, a connecting rod 908 and a piston 909 are coupled with crankshaft 903.

Primary sheave 13 is arranged with primary shaft 11 to which power output of drive unit 100 is transmitted, and secondary sheave 14 is arranged with the input shaft of centrifugal clutch 300. A driven mechanism 40 changes the groove width of secondary sheave 14 in response to the groove width of primary sheave 13 so that secondary sheave 14 is capable of holding belt 15. Control unit 600 controls the groove width of primary sheave 13.

Primary sheave 13 and secondary sheave 14 respectively include a fixed flange (31, 41) and a movable flange (32, 42) attached to a rotary shaft (primary shaft 11 and secondary shaft 12). Movable flange 42 of secondary sheave 14 is constantly urged in a direction to narrow the groove width by a spring 43 disposed in a compressed state between movable flange 42 and a clutch plate 301. Movement of movable flange 32 of primary sheave 13 is controlled by control unit 600. Movable flange 42 of secondary sheave 14 moves to a position at which a force received from V-belt 15 in response to movement of movable flange 32 of primary sheave 13 is balanced with an elastic reaction force of spring 43. Fixed flange (31, 41) and movable flanges (32, 42) form a V-groove for winding a belt thereon.

Belt 15 is wound onto such V-grooves of primary sheave 13 and secondary sheave 14 to transmit rotational driving force between both sheaves (13, 14). The groove widths of the V-grooves change by movement of movable flanges (32, 42) in the axial direction of primary shaft 11 and secondary shaft 12, and consequently, the change gear ratio of belt-type continuously variable transmission 200 changes.

Groove width adjustment mechanism 16 moves movable flange 32 of primary sheave 13 to adjust the groove width of primary sheave 13. Actuator 17 drives groove width adjustment mechanism 16. In this embodiment, the groove width of primary sheave 13 is adjusted by locomotion control on movable flange 32 of primary sheave 13 with actuator 17.

In this embodiment, an electric motor is used as actuator 17. As shown in FIG. 9, output of electric motor 17 is controlled by electricity supplied to electric motor 17 based on a control signal of control unit 600. The electricity supplied to electric motor 17 is preferably controlled by a PWM (Pulse Wide Modulation) method, for example. In the PWM method, the output of electric motor 17 is controlled by changing an ON/OFF time ratio (duty ratio) of electric motor 17 while the voltage of the supplied electricity is kept constant. However, the control method is not limited to the PWM method as long as the output of electric motor 17 is suitably controlled. For example, the output of electric motor 17 may be controlled by making the voltage of the supplied electricity changeable in an analog fashion.

Electric motor 17 is electrically connected to control unit 600 (gearshift control unit). Control unit 600 comprises an electronic control unit (ECU) that includes a calculation section (microcomputer (MPU)) and a storage section (memory). Control device 600 receives various vehicle information input from various sensors mounted on the vehicle.

Movable flange 32 moves in accordance with rotation of electric motor 17. The position of movable flange 32 is detected by flange position detection sensor 19. In addition, as shown in FIG. 2, various sensors such as a throttle position sensor 91 (TPS), an engine speed sensor 92, vehicle speed sensors 93, 94 as well as flange position detection sensor 19 are electrically connected to control unit 600, and control unit 600 receives required information from various sensors about various conditions of motorcycle 1000.

Throttle position sensor (TPS) 91 detects an accelerator opening (throttle opening). Engine speed sensor 92 detects engine rotational speed and, in this embodiment, detects the rotational speed of the crankshaft primary shaft 11). Sensor 93 detects the rotational speed of final gear shaft 401 (output shaft of centrifugal clutch 300). Sensor 94 detects the rotational speed of drive shaft 904 of driving wheel 500.

Control of centrifugal clutch 300 and continuously variable transmission 200 in this embodiment is now described.

Figure 3:
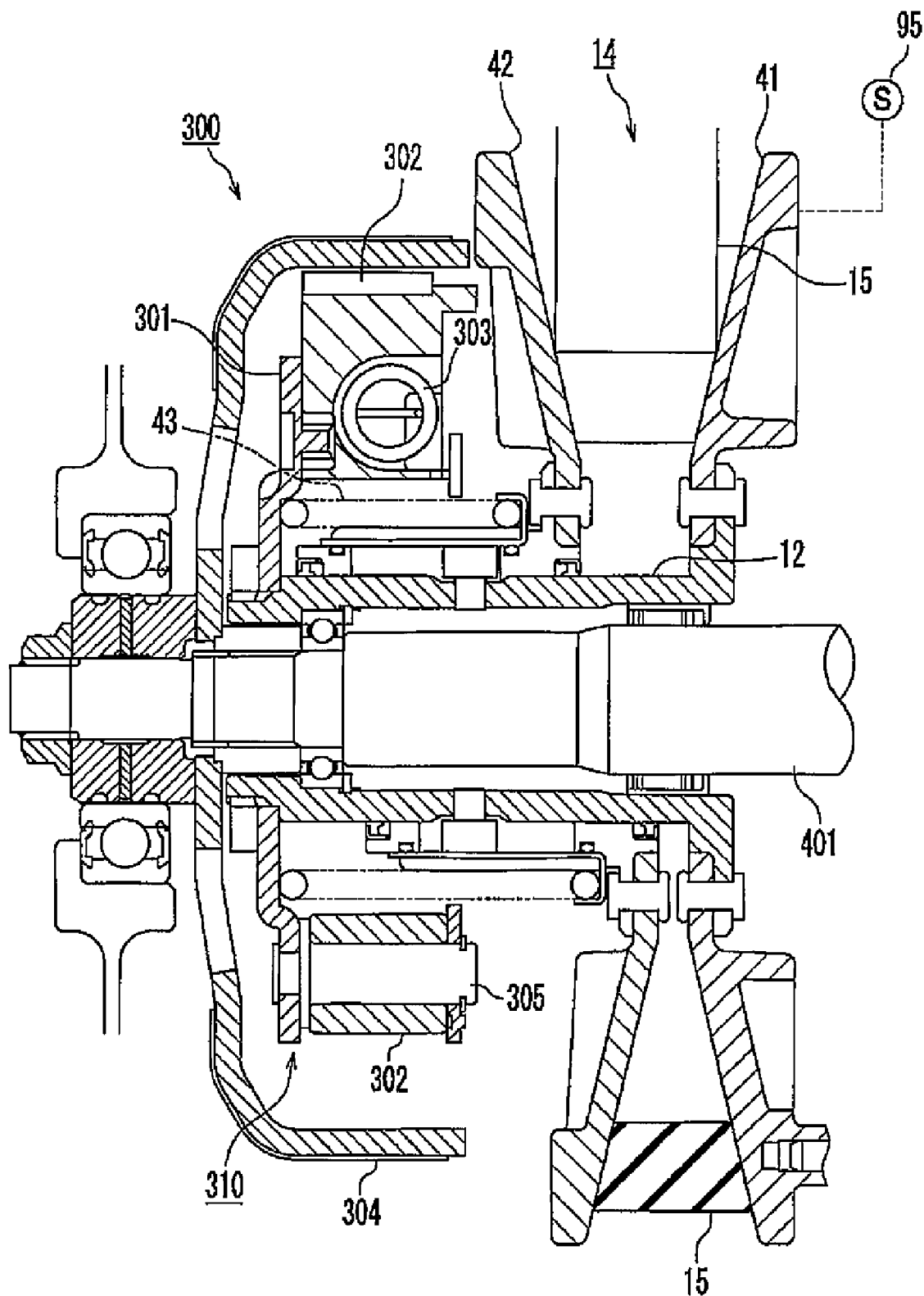
FIG. 3 is a cross-sectional side view of a centrifugal clutch.
Figure 4:
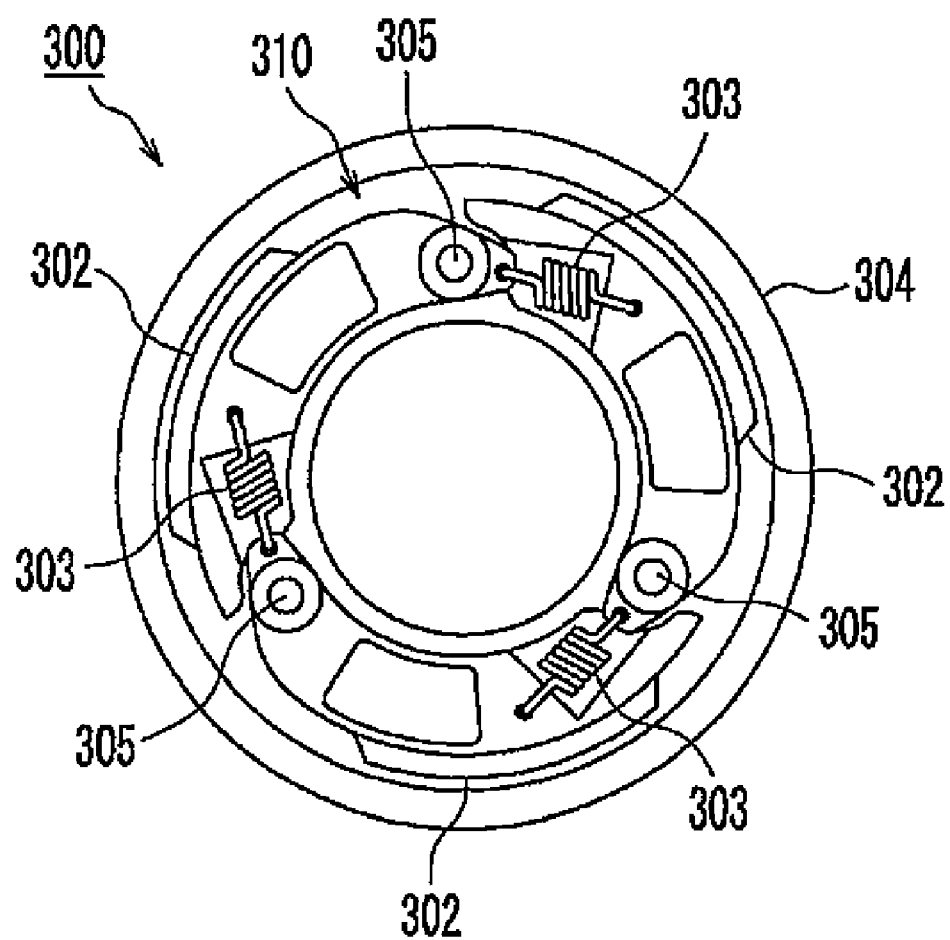
FIG. 4 is a cross-sectional front view of the centrifugal clutch.

As shown in FIG. 3, centrifugal clutch 300 is attached between a hollow central axis 12 of secondary sheave 14 and final gear shaft 401, which extends through such central axis 12. Although not shown, final gear shaft 401 is coupled with driving wheel 500 via a reduction gear 400.

Figure 12:
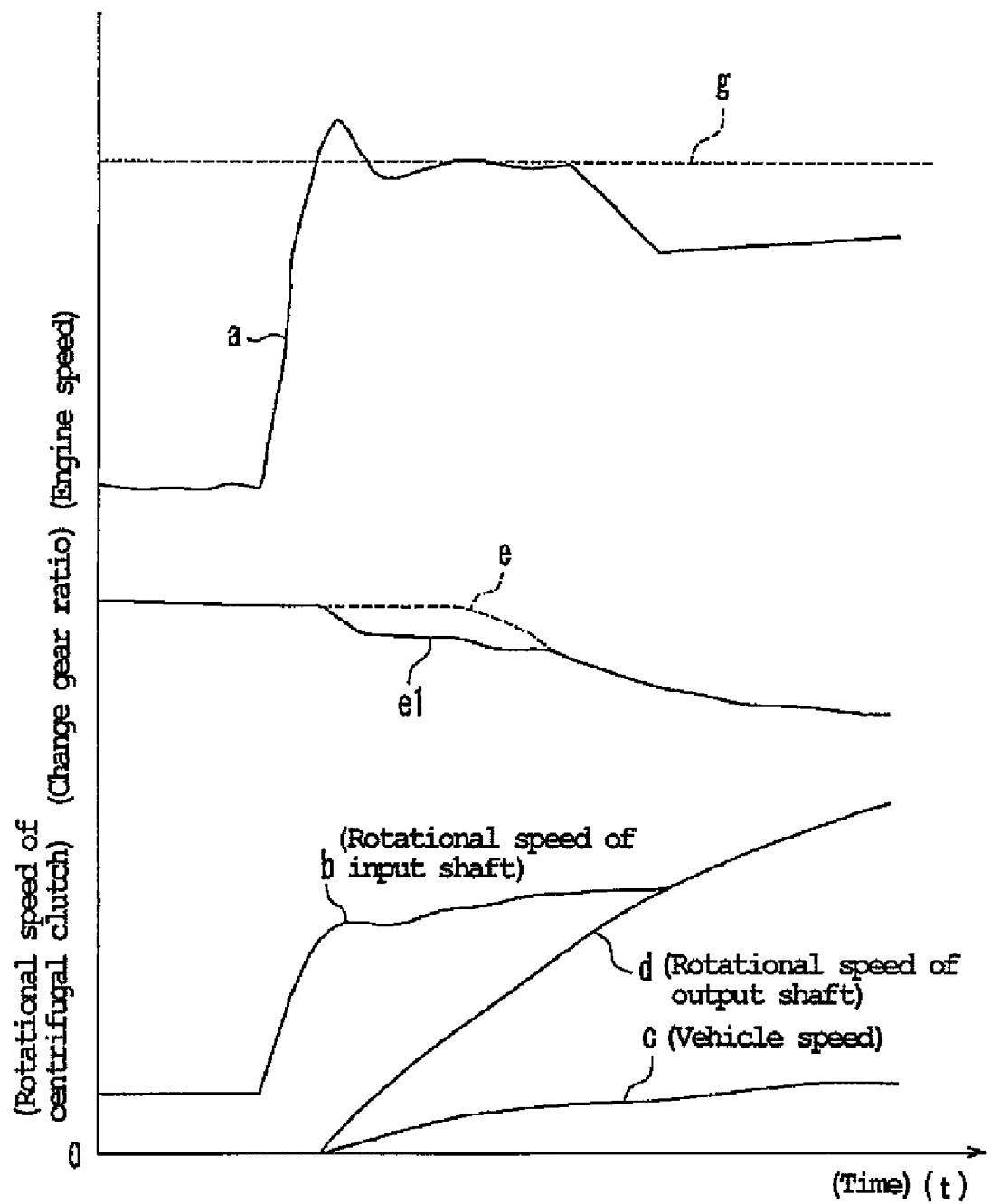
FIG. 12 is a diagram that indicates changes in the rotational speed of the engine, the change gear ratio, the rotational speed of the centrifugal clutch, and the vehicle speed at startup of the continuously variable transmission in accordance with the embodiment of the present invention.

As shown in FIG. 9, control unit 600 includes a clutch engagement processor 615 for controlling the change gear ratio to the TOP side in order to engage centrifugal clutch 300 to be engaged in the case where centrifugal clutch 300 is disengaged and where the rotational speed of engine 100 (drive unit) is higher than a predetermined first rotational speed. In other words, rotational speed "g" (the first rotational speed) is a standard for performing clutch engagement processing and is predetermined in control unit 600. As shown in FIG. 12, the change gear ratio is controlled to the TOP side in order to engage centrifugal clutch 300 when rotational speed "a" of engine 100 is higher than predetermined rotational speed "g".

Such clutch engagement processing prevents engine rotational speed "a" from becoming abnormally higher than predetermined rotational speed "g" when clutch shoes 302 are worn to a considerable degree. The stall time of centrifugal clutch 300 becomes shorter, and thus, centrifugal clutch 300 is quickly engaged. Meanwhile, when centrifugal clutch 300 functions normally, as shown in FIG. 6, rotational speed "g" is set such that engine rotational speed "a" does not become higher than predetermined rotational speed "g" at startup. Thereby, when centrifugal clutch 300 functions normally, clutch engagement processing is not performed. Continuously variable transmission 200 is controlled as usual, and obtains an appropriate amount of torque at startup.

As shown in FIG. 9, control unit 600 includes a first determination section 611, a first detection section 612, a first setting section 613, a second determination section 614 and clutch engagement processor 615. Control unit 600 performs designated processing according to predetermined fixed programs.

First determination section 611 determines whether or not centrifugal clutch 300 is engaged based on the rotational speed input to and output from centrifugal clutch 300. In other words, as shown in FIGS. 6 and 12, first determination section 611 determines that centrifugal clutch 300 is disengaged when rotational speed "b" input to centrifugal clutch 300 does not coincide with rotational speed "d" output from centrifugal clutch 300. On the other hand, first determination section 611 determines that centrifugal clutch 300 is engaged when rotational speed "b" coincides with rotational speed "d".

As shown in FIG. 11, rotational speed "b" input to centrifugal clutch 300 is detected based on a sensor 95 that detects the rotational speed of secondary sheave 14.

For rotational speed "d" output from centrifugal clutch 300, vehicle speed "c" is determined based on a detected value obtained by a sensor 96 of the rotational speed of drive shaft 904 of driving wheel 500, and rotational speed "d" of the output shaft (final gear shaft 401) of centrifugal clutch 300 is calculated in view of a reduction ratio of reduction gear 400 from vehicle speed "c".

First detection section 612 detects the rotational speed of engine 100. As shown in FIG. 9, the rotational speed of engine 100 is detected based on sensor 92 for detecting the rotational speed of the input shaft primary shaft 11) of continuously variable transmission 200.

As shown in FIG. 12, first setting section 613 sets up rotational speed "g" of engine 100, which becomes a standard for starting the processing in which the change gear ratio is controlled to the TOP side to engage centrifugal clutch 300. Rotational speed "g" is preferably stored in a storage section, such as nonvolatile memory, of control unit 600. Rotational speed "g" is preferably set in consideration of overshoot and the like, which may occur upon control, and is preferably set slightly lower than the upper limit of engine rotational speed "a" at the precise startup.

Second determination section 614 determines whether or not engine rotational speed "a" detected in first detection section 612 is higher than rotational speed "g" set in first setting section 613.

Clutch engagement processor 615 is a control program set in control unit 600, and performs clutch engagement processing for controlling change gear ratio "e" of continuously variable transmission 200 to the TOP side to engage centrifugal clutch 300 in the case where centrifugal clutch 300 is disengaged and where engine rotational speed "a" is higher than predetermined rotational speed "g".

Rotational speed "g" of engine 100, at which clutch engagement processing should be performed, is defined in advance in first setting section 613. Second determination section 614 determines whether or not engine rotational speed "a", which is detected in first detection section 612, is higher than rotational speed "g", which is set in first setting section 613. First determination section 611 determines whether or not centrifugal clutch 300 is engaged.

Figure 13:
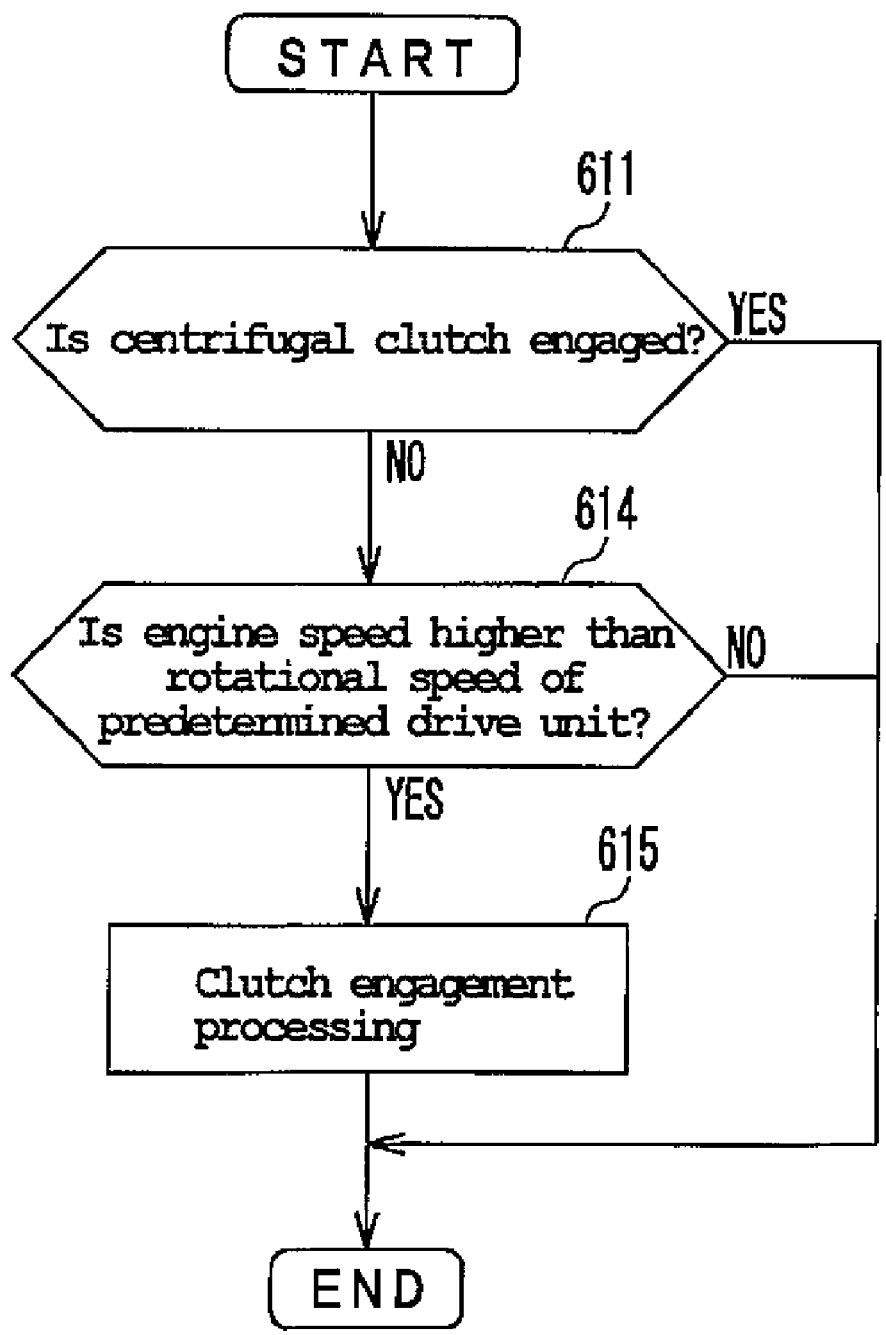
FIG. 13 is a flow chart of the continuously variable transmission in accordance with the embodiment of the present invention.

As shown in FIG. 13, control unit 600 performs clutch engagement processing 615 in the case where centrifugal clutch 300 is determined to be disengaged based on the determination result in first determination section 611, and where, in second determination section 614, the rotational speed of the engine of engine 100 is determined to be higher than the rotational speed of engine 100 set in first setting section 613.

As shown in FIG. 6, engine 100 on motorcycle 1000 runs at predetermined low rotational speed "a" in an idling state before startup. Centrifugal clutch 300 is disengaged in an idling state because engine rotational speed "a" is low. When the accelerator is operated at startup, engine rotational speed "a" becomes higher, and centrifugal clutch 300 starts stalling.

In the case where centrifugal clutch 300 functions normally, as shown in FIG. 6, as engine rotational speed "a" becomes higher, the transmission torque of centrifugal clutch 300 smoothly increases. Therefore, centrifugal clutch 300 is engaged within one to two seconds. At this moment, engine rotational speed "a" does not become higher than predetermined rotational speed "g". As described above, in the case where centrifugal clutch 300 functions normally, as shown in FIG. 13, it is not determined in second determination section 614 that engine rotational speed "a" is higher than predetermined rotational speed "g" (YES). Therefore, clutch engagement processing 615 is not performed.

On the other hand, when clutch shoes 302 have been worn to a considerable degree, clutch shoe 302 and clutch housing 304 tend to be very slippery. Therefore, as shown in FIG. 12, even after engine rotational speed "a" becomes high, centrifugal clutch 300 is slow to be engaged. Then, engine rotational speed "a" further increases. As shown in FIG. 13, once engine rotational speed "a" becomes higher than rotational speed "g" set in the first setting section, it is determined in first determination section 611 that centrifugal clutch 300 is disengaged (YES), and is also determined in second determination section 614 that engine rotational speed "a" is higher than predetermined rotational speed "g" (YES). As a result of these determinations, control unit 600 performs clutch engagement processing 615.

Clutch engagement processing 615 controls the change gear ratio to the TOP side to engage centrifugal clutch 300. If the change gear ratio is controlled to the TOP side, the rotational speed input to centrifugal clutch 300 becomes faster, and the centrifugal force acting on clutch shoes 302 of centrifugal clutch 300 becomes larger. On the contrary, the input torque input to centrifugal clutch 300 becomes smaller. Therefore, centrifugal clutch 300 becomes easily connectable. Once centrifugal clutch 300 becomes easily connectable, increase in engine rotational speed "a" can be suppressed. The engine speed does not rise sharply at startup with such control even when there are aforementioned defects on the centrifugal clutch. The torque transmitting to the driving wheel thereby becomes further suitable, and drivability improves.

As shown in FIG. 12, control unit 600 controls the change gear ratio to the TOP side to engage centrifugal clutch 300 in the case where the centrifugal clutch is disengaged and where engine rotational speed "a" is higher than predetermined rotational speed "g". Centrifugal clutch 300 is thereby engaged at an early stage even when clutch shoes 302 are worn to a considerable degree. Because centrifugal clutch 300 is engaged at an early stage, further abrasion of clutch shoes 302 is prevented and the replacement time of clutch shoes 302 is extended. Meanwhile, when centrifugal clutch 300 functions normally, as shown in FIG. 6, engine rotational speed "a" does not become higher than predetermined rotational speed "g". Therefore, clutch engagement processing 615 is not performed, and continuously variable transmission 200 is controlled as usual.

As described above, performance of clutch engagement processing 615 is automated by determinations of first determination section 611 and second determination section 614.

Alternatively, control unit 600 may cancel clutch engagement processing 615 in the case where it is determined in first determination section 611 that centrifugal clutch 300 is engaged. When centrifugal clutch 300 is engaged, regular ordinary change gear ratio control is performed and there is no need to keep clutch engagement processing 615. Thus, control unit 600 may automatically cancel clutch engagement processing 615.

A concrete example of the clutch engagement processing is now further described.

Motorcycle 1000 includes an accelerator operating means by which a rider operates the output. As shown in FIG. 9, control unit 600 includes a target change gear ratio setting section 616 for setting the target change gear ratio based on vehicle speed "c" and the throttle opening.

Target change gear ratio setting section 616 stores gear ratio map 601, which defines gear ratios of continuously variable transmission 200 based on vehicle information such as the vehicle speed and throttle opening. For example, in gear ratio map 601 of FIG. 14, the horizontal axis represents vehicle speed and the vertical axis represents engine rotational speed. A theoretical relation between vehicle speed and engine rotational speed at the predetermined change gear ratio at the time when the change gear ratio is made LOW is indicated by "r". A theoretical relation between vehicle speed and engine rotational speed at the predetermined change gear ratio at the time when the change gear ratio is made TOP is indicated by "s". In gear ratio map 601 of FIG. 14, a target rotational speed of engine "t" in a case of accelerating at full throttle, and a target rotational speed of engine "u" in a case of decelerating at fully closed throttle are set. There is a relation as follows: target change gear ratio=target engine speed/vehicle speed. Target engine speed "t" and target engine speed "u" are respectively replaceable with the target change gear ratio based on this relation. It should be noted that gear ratio map 601 is merely one example.

Figure 14:
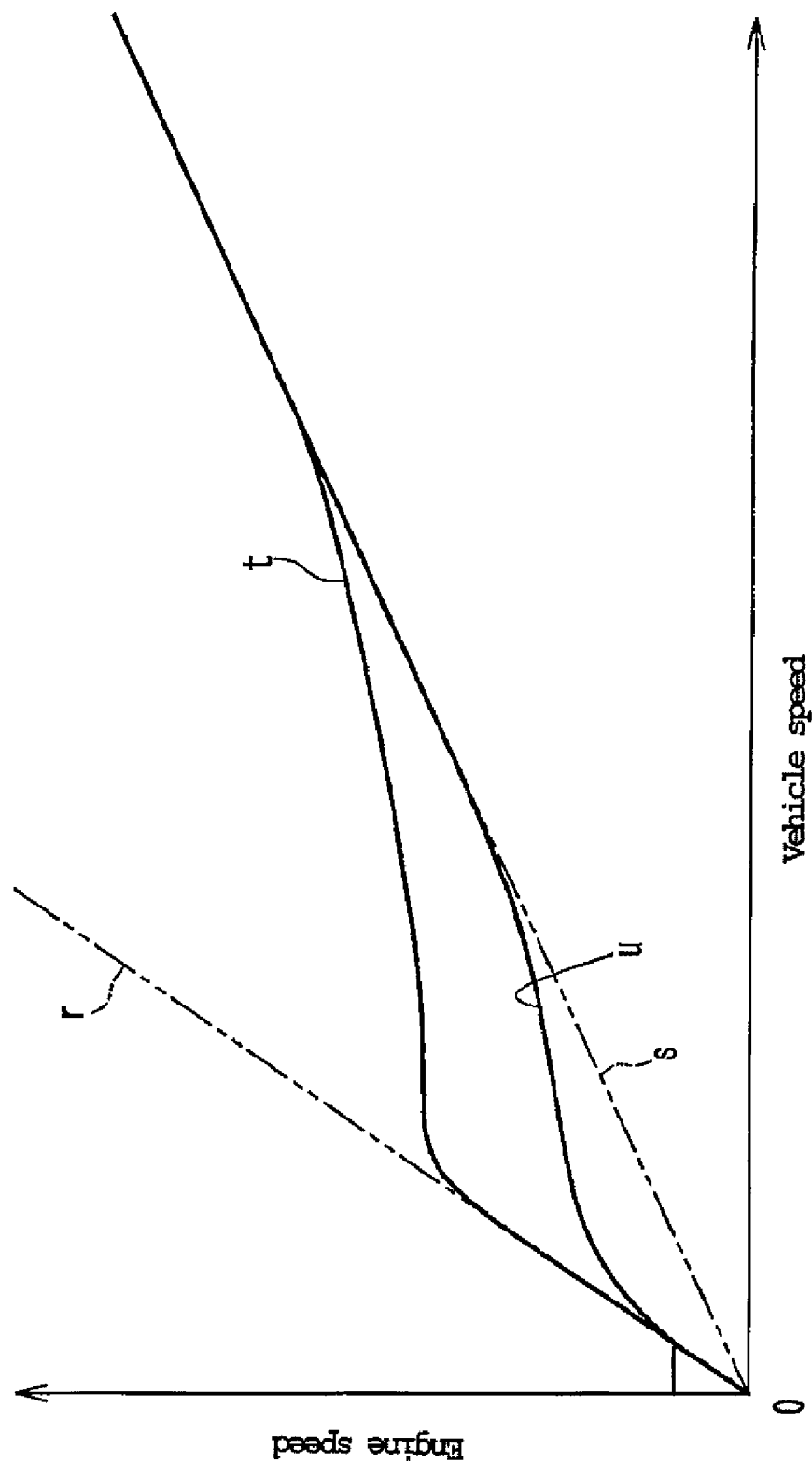
FIG. 14 is a gear ratio map of the continuously variable transmission in accordance with the embodiment of the present invention.

Target gear ratio setting section 616 initially determines a position of vehicle speed "c" on the horizontal axis of FIG. 14 based on information of vehicle speed "c". Target gear ratio setting section 616 then obtains, multiplied by vehicle speed of a predetermined coefficient in accordance with the throttle (accelerator) opening, a control target value of the rotational speed of the engine 100 (target rotational speed of the engine), which is between the target rotational speed of engine "u" for deceleration at fully closed throttle and the target rotational speed of engine "t" for acceleration at full throttle. A target change gear ratio is then obtained by dividing the target rotational speed of the engine by vehicle speed "c". As the throttle opening gets smaller, the target rotational speed of the engine (target change gear ratio) is set to be closer to the target gear ratio for deceleration at fully closed throttle (u). As the throttle opening gets larger, the target rotational speed of the engine (target change gear ratio) is set to be closer to the target gear ratio for acceleration at full throttle (t).

The rotational speed (second rotational speed) for setting the target change gear ratio at the time of the clutch connection processing is preset in clutch connection processor 615, and the target change gear ratio is preferably set by dividing the second rotational speed by the rotational speed input to the centrifugal clutch. Rotational speed "g" (first rotational speed) that determines whether or not clutch engagement processing should be performed is utilized for the second rotational speed for calculating the change gear ratio at the time of clutch engagement processing. However, the second rotational speed for calculating the change gear ratio at the time of clutch engagement processing can alternatively be set separately from rotational speed "g".

As described above, control unit 600 is provided with target change gear ratio setting section 616 for calculating the target rotational speed of the engine based on vehicle speed "c" and the throttle opening, and for setting the target change gear ratio by dividing the target rotational speed of the engine by vehicle speed "c". Clutch engagement processor 615 sets up the target change gear ratio by utilizing target change gear ratio setting section 616.

In other words, target change gear ratio setting section 616 performs processing to set the target change gear ratio for clutch engagement processing by utilizing predetermined rotational speed "g" instead of the target rotational speed of the engine, and rotational speed "b" input to the centrifugal clutch instead of vehicle speed "c", and by dividing predetermined rotational speed "g" by rotational speed "b" at the time of clutch engagement processing.

Thus, clutch engagement processor 615 sets up a target change gear ratio "e1" at the time of clutch engagement processing by dividing rotational speed "g" by rotational speed "b", as shown in FIG. 12. (target change gear ratio at the time of clutch engagement processing "e1"=rotational speed "g" (second rotational speed)/rotational speed "b" of the secondary sheave)

As shown in FIG. 11, the rotational speed of secondary sheave 14 detected by sensor 95 is adopted for rotational speed "b" input to centrifugal clutch 300. Dotted line "e" in FIG. 12 represents the regular target change gear ratio, which is set based on vehicle speed "c" and the throttle opening according to gear ratio map 601. Solid line "e1" in FIG. 12 represents the target change gear ratio at the time of clutch engagement processing, which is set by dividing predetermined rotational speed "g" by rotational speed "b" of secondary sheave 14.

Target change gear ratio setting section 616 usually controls the change gear ratio to the LOW shift while vehicle speed "c" is low at startup. As described above, when clutch shoes 302 are worn to a considerable degree and where the centrifugal clutch is disengaged due to a reason such as slippery conditions, as shown in FIG. 12, vehicle speed "c" is slow to increase. Thus, regular target change gear ratio "e" is set to the LOW shift.

As described above, clutch engagement processing 615 is performed when centrifugal clutch 300 is disengaged and engine rotational speed "a" is higher than predetermined rotational speed "g". Once clutch engagement processing 615 is performed, target change gear ratio "e1" is set by dividing predetermined rotational speed "g" by rotational speed "b" of secondary sheave 14. As shown in FIG. 12, rotational speed "b" increases in a similar manner as actual rotational speed "a" of the engine. However, because predetermined rotational speed "g" remains unchanged, the speed difference between rotational speed "b" and actual rotational speed "a" becomes smaller as rotational speed "b" increases. Consequently, target change gear ratio "e1" is set to the TOP side.

On the other hand, based on the vehicle speed and throttle opening, the change gear ratio is set according to gear ratio map 601 in a regular control in which clutch engagement processing is not performed. According to gear ratio map 601, the change gear ratio in the LOW side is set at startup. Therefore, in the regular control, the target change gear ratio in the LOW side is set for target change gear ratio "e" because vehicle speed "c" is slow to increase at startup.

As described above, target change gear ratio "e1" at the time of clutch engagement processing is set to the TOP side compared to target change gear ratio "e" in the regular control in the case where clutch engagement processing is not performed. In other words, target change gear ratio "e" in the case where clutch engagement processing is not performed is calculated by calculating the target rotational speed of the engine based on the gear ratio map as described above, and by dividing the target rotational speed of the engine by the vehicle speed. In the case where the clutch is disengaged due to a reason such as a slipping clutch, vehicle speed does not increase. Therefore, target change gear ratio "e" in the case where the clutch engagement processing is not performed becomes higher, and the LOW ratio is set. On the other hand, target change gear ratio "e1" at the time of clutch engagement processing is calculated as target change gear ratio "e1"=rotational speed "g"/rotational speed "b" of the secondary sheave. Target change gear ratio "e1" becomes lower than target change gear ratio "e", and is set to the TOP even in the case where the clutch is slipping ratio because rotational speed "b" of the secondary sheave increases in comparison with the vehicle speed. Therefore, when the clutch is disengaged due to a reason such as a slipping clutch, target change gear ratio "e1" is set to the TOP ratio, which is higher than target change gear ratio "e". In addition, when the continuously variable transmission is controlled according to target change gear ratio "e1" set in such a manner, rotational speed "b" of the secondary sheave increases, and engagement of the centrifugal clutch is soon performed. Because rotational speed "b" is adjusted in response to the above, target change gear ratio "e1" does not become a TOP ratio that is excessively high, and an appropriate target change gear ratio "e1" is set.

In this embodiment, continuously variable transmission 200 is controlled to the TOP side, which is higher than usual, by controlling the change gear ratio based on target change gear ratio "e1" at the time of clutch engagement processing. As described above, once continuously variable transmission 200 is controlled to the TOP side, centrifugal clutch 300 is easily engaged. Thereby, defects such as that centrifugal clutch 300 slips at startup are fixed, and engine speed is prevented from rising sharply at startup. Torque transmitted to the driving wheel is thereby suitable and drivability is improved.

As described above, when clutch engagement processing is performed and target change gear ratio "e", which is usually set, becomes closer to the TOP side than target change gear ratio "e1" set at the time of clutch engagement processing, control unit 600 preferably cancels clutch engagement processing. When target change gear ratio "e1" coincides with target change gear ratio "e", clutch engagement processing may be either canceled or continued. In other words, when target change gear ratio "e" comes closer to the TOP side than target change gear ratio "e1", centrifugal clutch 300 is easily engaged if the change gear ratio is controlled at target change gear ratio "e". Therefore, clutch engagement processing 615 is no longer needed and should be canceled.

In addition, the control unit may cancel clutch engagement processing 615 when centrifugal clutch 300 is detected as being engaged. That is, once centrifugal clutch 300 is engaged, clutch engagement processing 615 may be canceled.

Setting of target change gear ratio "e1" at the time of clutch engagement processing and cancellation of clutch engagement processing is now described with reference to FIG. 15.

Figure 15:
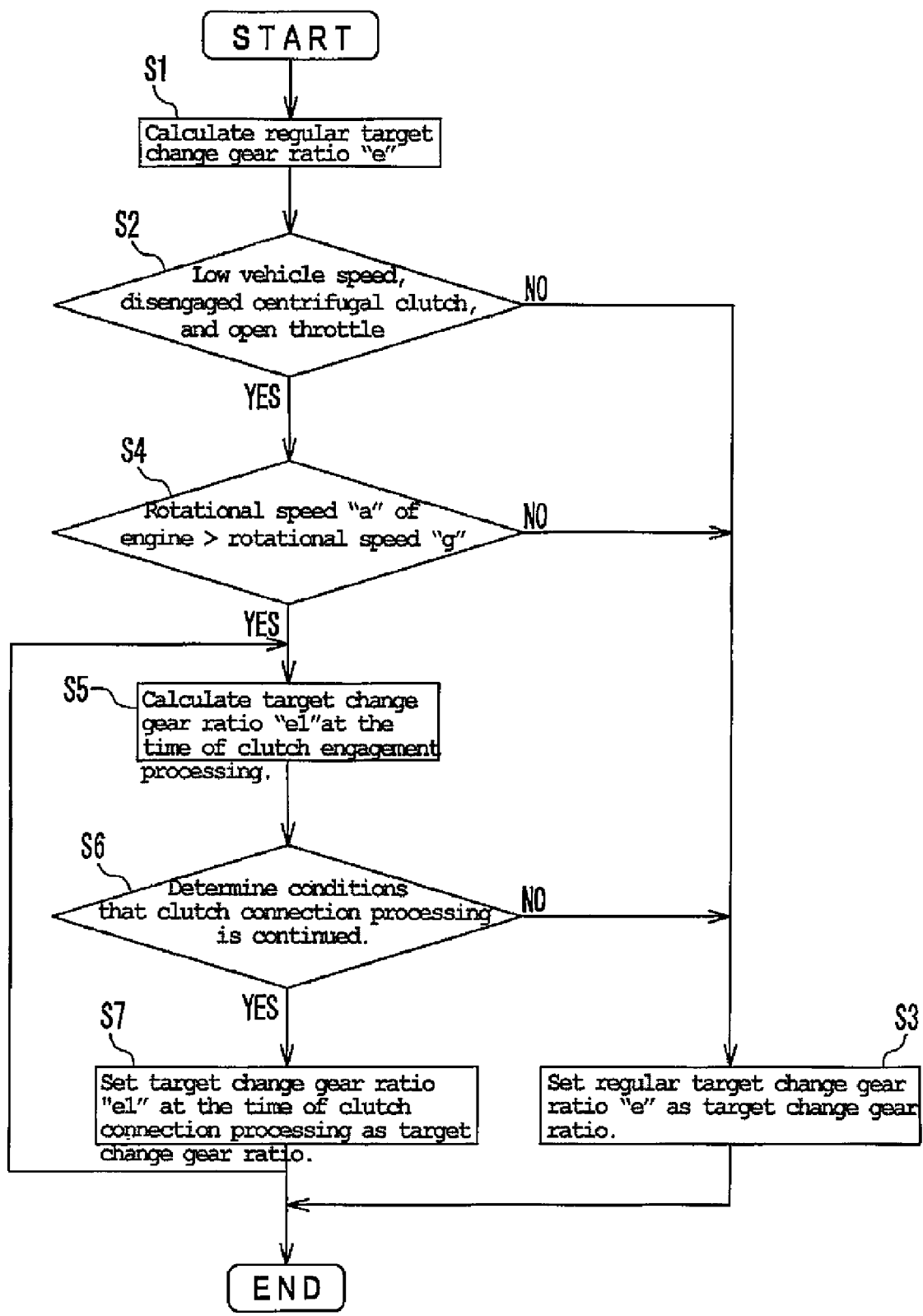
FIG. 15 is a flow chart of the continuously variable transmission in accordance with the embodiment of the present invention.

As shown in FIG. 15, the regular change gear ratio is calculated in target change gear ratio setting section 616 based on the vehicle speed and the throttle opening (S1). Next, it is determined that the vehicle is at startup by determining whether or not all three of the following conditions are satisfied: the first condition is that the vehicle speed is lower than the predetermined vehicle speed; the second condition is that centrifugal clutch 300 is disengaged; and the third condition is that the throttle is open (S2). If the determination in S2 is NO, target change gear ratio "e", which is usually set in the target change gear ratio setting section 616, becomes the final target change gear ratio (S3).

If the determination in S2 is YES, it is determined whether or not the rotational speed of engine 100 is higher than predetermined rotational speed "g" (S4). If the determination in S4 is NO, that is, as shown in FIG. 6, if rotational speed "a" of engine 100 is not higher than predetermined rotational speed "g", centrifugal clutch 300 is engaged normally. Therefore, there is no need to perform clutch engagement processing 615 and regular target change gear ratio "e" becomes the final target change gear ratio (S3).

If the determination in S4 is YES, clutch engagement processing 615 is performed. In other words, as shown in FIG. 12, if engine rotational speed "a" is higher than predetermined rotational speed "g", there is a possibility of abnormality in centrifugal clutch 300, and clutch engagement processing 615 is performed. Target change gear ratio "e1" at the time of clutch engagement processing is calculated (S5) by dividing predetermined rotational speed "g" by rotational speed "b" of secondary sheave 14.

Then, conditions for maintaining clutch connection processing 615 are determined (S6). In this embodiment, it should be determined that target change gear ratio "e1", which is calculated in S5, comes closer to the TOP side than regular target change gear ratio "e" calculated in S1. The following formula is determined: regular target change gear ratio "e">target change gear ratio "e1" at the time of clutch engagement processing.

If the conditions for maintaining clutch engagement processing 615 are not satisfied in the determination in S6, that is, if target change gear ratio "e1" is not closer to the TOP side than regular target change gear ratio "e", clutch engagement processing is cancelled, and regular target change gear ratio "e" becomes the final target change gear ratio (S3).

If the conditions for maintaining clutch engagement processing are satisfied in the determination in S6, that is, if target change gear ratio "e1" is closer to the TOP side than regular target change gear ratio "e", clutch engagement processing is continued, and target change gear ratio "e1" becomes the final target change gear ratio (S7). Then, while clutch engagement processing 615 continues, the processing in S5 and S6 are repeated.

In this embodiment, clutch engagement processing 615 is automatically performed by the determinations in S2 and S4, and clutch engagement processing 615 is automatically cancelled by the determination in S6.

The cancellation condition of centrifugal clutch 300 determined in S6 is as follows: the clutch engagement processing may be cancelled either in the case where the engaging condition of the centrifugal clutch is detected or in the case when regular target change gear ratio "e" is closer to the TOP side than target change gear ratio "e1" at the time of clutch engagement processing, whichever comes first.

As described above, it is possible to smoothly move from the unique controlling state at startup to the controlling state while the vehicle is running by setting that the clutch engagement processing is automatically canceled under the appropriate conditions.

According to this embodiment, the control unit includes the target change gear ratio setting section for setting the target change gear ratio based on the vehicle speed and throttle opening, and the clutch engagement processing sets up the target change gear ratio in the target change gear ratio setting section by dividing predetermined rotational speed "g" by rotational speed "b" of secondary sheave 14. Therefore, the change gear ratio is shifted to the TOP side by an appropriate amount in accordance with abnormal rise of engine rotational speed "a". Thereby, even when centrifugal clutch 300 is worn to a considerable degree, centrifugal clutch 300 is appropriately engaged at the early stage.

Although an embodiment of the present invention has been described above, a continuously variable transmission in accordance with the present invention is not limited to the embodiment described above.

For example, the structures of continuously variable transmission 200, groove width adjustment mechanism 16, flange position detection sensor 19, control device 600 and so forth are not limited to those disclosed in the above embodiment.

Also, the detection of rotational speed input to and output from centrifugal clutch 300 are not limited to those described above. For example, the rotational speed input to centrifugal clutch 300 may be detected by a sensor for detecting the rotational speed of rotary shaft 12 provided with an assembly of clutch shoes 302. In addition, the rotational speed output from centrifugal clutch 300 may be detected by a sensor for detecting the rotational speed of clutch housing 304. The above description is merely one example, and various modifications can be made. The rotational speed of the input shaft of the continuously variable transmission can also be detected by the rotational speeds of the primary sheave and the primary shaft. In addition, where the change gear ratio is controlled by the control unit, the control unit may perform clutch engagement processing for controlling the change gear ratio to the TOP side to engage the centrifugal clutch in the case where the centrifugal clutch is disengaged and where the rotational speed of the engine of the drive unit is higher than a predetermined first engine. This description illustrates such an embodiment, and methods for calculating the target change gear ratio and that of the target change gear ratio at the time of clutch engagement processing are not limited to those disclosed herein.

The invention is not limited to a belt-type continuously variable transmission. The drive unit is not limited to an engine but can be an electric motor, etc. In other words, the present invention is a continuously variable transmission for transmitting power from an output shaft of a drive unit to an input shaft of a centrifugal clutch, and is widely applicable as long as a change gear ratio is controlled by a control unit. A variety of modifications can be made for the structures of the drive unit, the continuously variable transmission, and the centrifugal clutch.

Continuously variable transmission 200 may be applied to various types of vehicles other than motorcycles. For example, continuously variable transmission 200 can be widely applied to straddle-type vehicles (including a three-wheeled buggy, a four-wheeled buggy, and a snowmobile), scooter-type vehicles, or a small-sized vehicles such as golf carts. Although continuously variable transmission 200 is described as included in a power unit, it may be provided separately from the power unit.

As described above, a continuously variable transmission in accordance with the present invention can be widely provided to vehicles or the like.

The invention claimed is:

1. A continuously variable transmission for transmitting power from an output shaft of a drive unit to an input shaft of a centrifugal clutch, wherein a change gear ratio of the continuously variable transmission is controlled by a control unit, and the control unit performs clutch engagement processing for controlling the change gear ratio to a TOP side to engage the centrifugal clutch in a case where the centrifugal clutch is disengaged and a rotational speed of the drive unit is higher than a predetermined first rotational speed.

2. The continuously variable transmission according to claim 1, wherein the control unit includes a first determination section for determining whether or not the centrifugal clutch is engaged.

3. The continuously variable transmission according to claim 2, wherein the first determination section determines whether or not the centrifugal clutch is engaged based on a rotational speed input to the centrifugal clutch and a rotational speed output from the centrifugal clutch.

4. The continuously variable transmission according to claim 1, wherein the control unit comprises:
a first detection section for detecting a rotational speed of the drive unit;
a first setting section for setting the first rotational speed as a standard for starting processing control of the change gear ratio to the TOP side to engage the centrifugal clutch;
a second determination section for determining whether or not the rotational speed of the drive unit detected in the first detection section is higher than the first rotational speed set in the first setting section.

5. The continuously variable transmission according to claim 4, wherein the first detection section detects the rotational speed of the drive unit based on a rotational speed of the input shaft.

6. The continuously variable transmission according to claim 2, wherein the clutch engagement processing is canceled when the first determination section determines that the centrifugal clutch is engaged.

7. The continuously variable transmission according to claim 1, wherein the clutch engagement processing predetermines a second rotational speed, and divides the second rotational speed by a rotational speed input to the centrifugal clutch to set a target change gear ratio at a time of the clutch engagement processing.

8. The continuously variable transmission according to claim 7, wherein
the drive unit is an engine;
the control unit includes a target change gear ratio setting section for calculating a target rotational speed of the engine based on a vehicle speed and a throttle opening and for setting a target change gear ratio by dividing the target rotational speed of the engine by the vehicle speed; and
the clutch engagement processing sets a target change gear ratio for the clutch engagement processing in the target change gear ratio setting section by utilizing the predetermined second rotational speed instead of the target rotational speed of the engine, and a rotational speed input to the centrifugal clutch instead of the vehicle speed, and by dividing the predetermined rotational speed for the clutch engagement processing by the rotational speed input to the centrifugal clutch.

9. The continuously variable transmission according to claim 7, wherein the first rotational speed is used as the second rotational speed.

10. The continuously variable transmission according to claim 8, wherein the control unit cancels the clutch engagement processing when the target change gear ratio set in the target change gear ratio setting section is closer to the TOP side than the target change gear ratio for the clutch engagement processing.

11. The continuously variable transmission according to claim 1, wherein the control unit cancels the clutch engagement processing when the centrifugal clutch is detected as being engaged.

12. The continuously variable transmission according to claim 8, wherein the control unit cancels the clutch engagement processing when the centrifugal clutch is detected as being engaged, or when the target change gear ratio set in the target change gear ratio setting section is closer to the TOP side than the target change gear ratio for the clutch engagement processing.

13. The continuously variable transmission according to claim 1, wherein
the continuously variable transmission is a belt-type continuously transmission in which a belt is wound around a primary sheave and a secondary sheave respectively having a pair of flanges for relative movement in an axial direction,
the primary sheave is mounted on a primary shaft, to which output power of a drive shaft is transmitted,
the secondary sheave is mounted on the input shaft of the centrifugal clutch,
a driven mechanism changes a groove width of the secondary sheave according to a groove width of the primary sheave so that the secondary sheave is capable of holding the belt; and
a control unit controls the groove width of the primary sheave.

14. A vehicle comprising a continuously variable transmission according to claim 1.

15. The vehicle according to claim 14, wherein the vehicle is selected from a group comprising a straddle-type vehicle, a scooter-type vehicle or a golf cart.

16. A method for controlling a change gear ratio of a continuously variable transmission comprising:
performing clutch engagement processing by controlling the change gear ratio to a TOP side to engage a centrifugal clutch when the centrifugal clutch is disengaged and engine rotational speed is higher than a predetermined rotational speed.

17. The method according to claim 16, further comprising:
determining whether or not the centrifugal clutch is engaged based on a rotational speed input to the centrifugal clutch and a rotational speed output from the centrifugal clutch.

18. The method according to claim 16, further comprising:
cancelling clutch engagement processing when the centrifugal clutch is engaged.

* * * * *